(12) United States Patent
Lee et al.

(10) Patent No.: US 10,057,905 B2
(45) Date of Patent: *Aug. 21, 2018

(54) METHOD AND APPARATUS FOR TRANSMITTING DEVICE-TO-DEVICE RELATED INFORMATION IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,921

(22) Filed: Aug. 8, 2017

(65) Prior Publication Data

US 2017/0339689 A1  Nov. 23, 2017

Related U.S. Application Data

(63) Continuation of application No. 15/357,338, filed on Nov. 21, 2016, now Pat. No. 9,756,643, which is a
(Continued)

(51) Int. Cl.
*H04W 72/04* (2009.01)
*H04W 72/12* (2009.01)
(Continued)

(52) U.S. Cl.
CPC ......... *H04W 72/048* (2013.01); *H04W 8/005* (2013.01); *H04W 8/14* (2013.01);
(Continued)

(58) Field of Classification Search
CPC . H04W 72/48; H04W 72/1215; H04W 72/14; H04W 76/043; H04W 36/0061;
(Continued)

(56) References Cited

U.S. PATENT DOCUMENTS 8,885,542 B2  11/2014  Bucknell et al.
9,532,320 B2  12/2016  Feuersaenger et al.
(Continued)

FOREIGN PATENT DOCUMENTS

CN  101932019 A  12/2010
CN  102365897 A  2/2012
(Continued)

OTHER PUBLICATIONS

Fodor et al., "Design Aspects of Network Assisted Device-to-Device Communications," IEEE Communications Magazine, IEEE Service Center, Piscataway, US, vol. 50, No. 3, Mar. 1, 2012, pp. 170-177, XP011429640.
(Continued)

*Primary Examiner* — Ajay Cattungal
(74) *Attorney, Agent, or Firm* — Birch, Stewart, Kolasch & Birch, LLP

(57) ABSTRACT

A method is presented for performing a device-to-device (D2D) operation by a first user equipment (UE) in a wireless communication system. The first UE receives configuration information of an evolved-universal mobile telecommunications service (UMTS) terrestrial radio access network (E-UTRAN) planned mode for the D2D operation from an evolved NodeB (eNB). The E-UTRAN planned mode is a D2D mode in which the eNB controls radio resources for the D2D operation. The UE performs the D2D operation with a second UE by using the radio resources in the E-UTRAN planned mode.

8 Claims, 11 Drawing Sheets

Related U.S. Application Data continuation of application No. 14/413,662, filed as application No. PCT/KR2013/006537 on Jul. 22, 2013, now Pat. No. 9,648,638.

(60) Provisional application No. 61/673,739, filed on Jul. 20, 2012.

(51) Int. Cl.

| | | |
|---|---|---|
| *H04W 36/00* | (2009.01) | |
| *H04W 76/04* | (2009.01) | |
| *H04W 76/02* | (2009.01) | |
| *H04W 72/14* | (2009.01) | |
| *H04W 8/24* | (2009.01) | |
| *H04W 24/08* | (2009.01) | |
| *H04W 8/14* | (2009.01) | |
| *H04W 68/02* | (2009.01) | |
| *H04W 60/04* | (2009.01) | |
| *H04W 8/00* | (2009.01) | |
| *H04W 76/23* | (2018.01) | |
| *H04W 76/14* | (2018.01) | |
| *H04W 76/18* | (2018.01) | |
| *H04W 76/27* | (2018.01) | |
| *H04W 76/28* | (2018.01) | |
| *H04W 28/02* | (2009.01) | |
| *H04W 88/06* | (2009.01) | |
| *H04W 92/18* | (2009.01) | |
| *H04W 24/10* | (2009.01) | |
| *H04W 76/11* | (2018.01) | |

(52) U.S. Cl.
CPC ............. *H04W 8/24* (2013.01); *H04W 24/08* (2013.01); *H04W 36/0061* (2013.01); *H04W 60/04* (2013.01); *H04W 68/02* (2013.01); *H04W 72/042* (2013.01); *H04W 72/1215* (2013.01); *H04W 72/14* (2013.01); *H04W 76/023* (2013.01); *H04W 76/027* (2013.01); *H04W 76/043* (2013.01); *H04W 76/046* (2013.01); *H04W 76/048* (2013.01); *H04W 76/14* (2018.02); *H04W 76/18* (2018.02); *H04W 76/23* (2018.02); *H04W 76/27* (2018.02); *H04W 76/28* (2018.02); *H04W 24/10* (2013.01); *H04W 28/0278* (2013.01); *H04W 76/021* (2013.01); *H04W 76/11* (2018.02); *H04W 88/06* (2013.01); *H04W 92/18* (2013.01)

(58) Field of Classification Search
CPC ..... H04W 8/005; H04W 60/04; H04W 68/02; H04W 8/14; H04W 76/027; H04W 76/046; H04W 8/24; H04W 76/023; H04W 24/08; H04W 72/042; H04W 76/048; H04W 76/021; H04W 88/06; H04W 24/10; H04W 92/18
See application file for complete search history.

(56) References Cited

U.S. PATENT DOCUMENTS

| | | | | |
|---|---|---|---|---|
| 2007/0097926 A1* | 5/2007 | Liu | ......................... | H04L 47/10 370/335 |
| 2007/0258402 A1* | 11/2007 | Nakamata | ............. | H04W 72/06 370/329 |
| 2009/0316633 A1* | 12/2009 | Kato | ..................... | H04L 1/0026 370/329 |
| 2010/0165882 A1 | 7/2010 | Palanki et al. | | |
| 2010/0240312 A1 | 9/2010 | Peng et al. | | |
| 2010/0261469 A1 | 10/2010 | Ribeiro et al. | | |
| 2010/0279695 A1* | 11/2010 | Amirijoo | .......... | H04W 36/0055 455/438 |
| 2011/0134827 A1 | 6/2011 | Hooli et al. | | |
| 2011/0261747 A1 | 10/2011 | Wang et al. | | |
| 2011/0312331 A1 | 12/2011 | Hakola et al. | | |
| 2011/0317569 A1 | 12/2011 | Kneckt et al. | | |
| 2011/0317586 A1 | 12/2011 | Palanki et al. | | |
| 2012/0020231 A1 | 1/2012 | Chen et al. | | |
| 2012/0083283 A1 | 4/2012 | Phan et al. | | |
| 2012/0157123 A1 | 6/2012 | Li et al. | | |
| 2012/0163235 A1 | 6/2012 | Ho et al. | | |
| 2012/0184306 A1 | 7/2012 | Zou et al. | | |
| 2013/0064103 A1 | 3/2013 | Koskela et al. | | |
| 2013/0107722 A1 | 5/2013 | Huang | | |
| 2013/0107782 A1 | 5/2013 | Anas et al. | | |
| 2013/0156000 A1 | 6/2013 | Hwang | | |
| 2013/0170387 A1 | 7/2013 | Wang et al. | | |
| 2013/0208641 A1 | 8/2013 | Baghel et al. | | |
| 2013/0272294 A1* | 10/2013 | Mildh | ................... | H04W 76/14 370/350 |
| 2013/0322277 A1 | 12/2013 | Vanganuru et al. | | |
| 2013/0329711 A1* | 12/2013 | Seo | ...................... | H04J 11/0069 370/336 |
| 2013/0336307 A1 | 12/2013 | Park et al. | | |
| 2014/0036718 A1 | 2/2014 | Gao et al. | | |
| 2014/0038629 A1 | 2/2014 | Iwamura et al. | | |
| 2014/0153390 A1 | 6/2014 | Ishii et al. | | |
| 2014/0200016 A1 | 7/2014 | Siomina et al. | | |
| 2014/0335875 A1* | 11/2014 | Li | ......................... | H04W 8/005 455/450 |
| 2015/0109943 A1 | 4/2015 | Sahin et al. | | |
| 2015/0156757 A1* | 6/2015 | Kalhan | ................ | H04L 1/1607 370/330 |
| 2015/0304969 A1 | 10/2015 | Morita et al. | | |
| 2017/0111754 A1 | 4/2017 | Baghel et al. | | |

FOREIGN PATENT DOCUMENTS

| | | |
|---|---|---|
| CN | 102550117 A | 7/2012 |
| EP | 2 773 129 A1 | 9/2014 |
| GB | 2494633 A | 3/2013 |
| JP | 2002-209028 A | 7/2002 |
| JP | 2012-119827 A | 6/2012 |
| JP | 2012-514435 A | 6/2012 |
| JP | 2013-524643 A | 6/2013 |
| JP | 2013-534775 A | 9/2013 |
| JP | 2014-504814 A | 2/2014 |
| KR | 10-2012-0065919 A | 6/2012 |
| WO | WO 2011/109027 A1 | 9/2011 |
| WO | WO 2011/123549 A1 | 10/2011 |
| WO | WO 2012/073846 A1 | 6/2012 |
| WO | WO 2012/088470 A1 | 6/2012 |
| WO | WO 2012/091420 A2 | 7/2012 |
| WO | WO 2012/144320 A1 | 10/2012 |

OTHER PUBLICATIONS

Intel Corporation, "Suggested D2D Terminologies (Operator Managed, Operator Assisted, Operator Free)," 3GPP TSG-SA WG1 Meeting #57, S1-120059, Kyoto, Japan, Feb. 13-17, 2012, 3 pages.
Marsch et al., "Future Mobile Communication Networks: Challenges in the Design and Operation," IEEE Vehicular Technology Magazine, vol. 7, No. 1, Mar. 2012 (published Jan. 27, 2012), pp. 16-23.

* cited by examiner

METHOD AND APPARATUS FOR TRANSMITTING DEVICE-TO-DEVICE RELATED INFORMATION IN WIRELESS COMMUNICATION SYSTEM

CROSS-REFERENCE TO RELATED APPLICATIONS

This Application is a Continuation of U.S. patent application Ser. No. 15/357,338 filed on Nov. 21, 2016 (now U.S. Pat. No. 9,756,643 issued on Sep. 5, 2017), which is a Continuation of U.S. patent application Ser. No. 14/413,662 filed on Jan. 8, 2015 (now U.S. Pat. No. 9,648,638 issued on May 9, 2017), which is filed as the National Phase of PCT/KR2013/006537 filed on Jul. 22, 2013, which claims the benefit under 35 U.S.C. § 119(e) to U.S. Provisional Application No. 61/673,739 filed on Jul. 20, 2012, all of which are hereby expressly incorporated by reference into the present application.

BACKGROUND OF THE INVENTION

A universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

With the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

How a network and UEs should operate for D2D connection should be specified.

SUMMARY OF THE INVENTION

The present invention relates to wireless communications, and more particularly, to a method and apparatus for transmitting D2D related information in a wireless communication system.

The present invention provides a method and apparatus for transmitting D2D related information in a wireless communication system. The present invention provides a method for indicating a network connection of a mobile device for D2D communication. The present invention also provides a method for sharing information on D2D connection between network nodes.

In an aspect, a method for transmitting, by a first mobile device, device-to-device (D2D) related information in a wireless communication system is provided. The method includes transmitting an identity of a network node to a second mobile device. The first mobile device and the network node are connected by a first connection, and the first mobile device and the second mobile device are connected by a second connection.

The identity of the network node may be a cell identity of a cell controlled by the network node.

The first connection may be a radio resource control (RRC) connection, and the second connection may be a D2D connection.

The method may further include transmitting an identity of the first mobile device, allocated by the network node, to the second mobile device.

The first mobile device may be a master user equipment (M-UE) of the second connection, and the second mobile device may be a slave UE (S-UE) of the second connection.

The identity of the network node may be transmitted via a D2D connection setup message.

The first mobile device may be an S-UE of the second connection, and the second mobile device may be an M-UE of the second connection.

The identity of the network node may be transmitted via a D2D connection setup complete message.

In another aspect, a method for transmitting, by a first mobile device, device-to-device (D2D) related information in a wireless communication system is provided. The method includes informing a second mobile device whether a first connection between the first mobile device and a network node is established or not. The first mobile device and the second mobile device are connected by a second connection.

In another aspect, a method for transmitting, by a base station, device-to-device (D2D) related information in a wireless communication system is provided. The method includes transmitting information on a D2D connection between mobile devices which are connected to the base station, to a neighboring network node. The information on the D2D connection includes at least one of information on the mobile devices, and a D2D mode.

The information on the mobile devices may include a list of identities of the mobile devices.

The information on the D2D connection may include parameters or configurations related to the D2D connection.

D2D connection can be established efficiently between mobile devices.

DETAILED DESCRIPTION OF THE EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
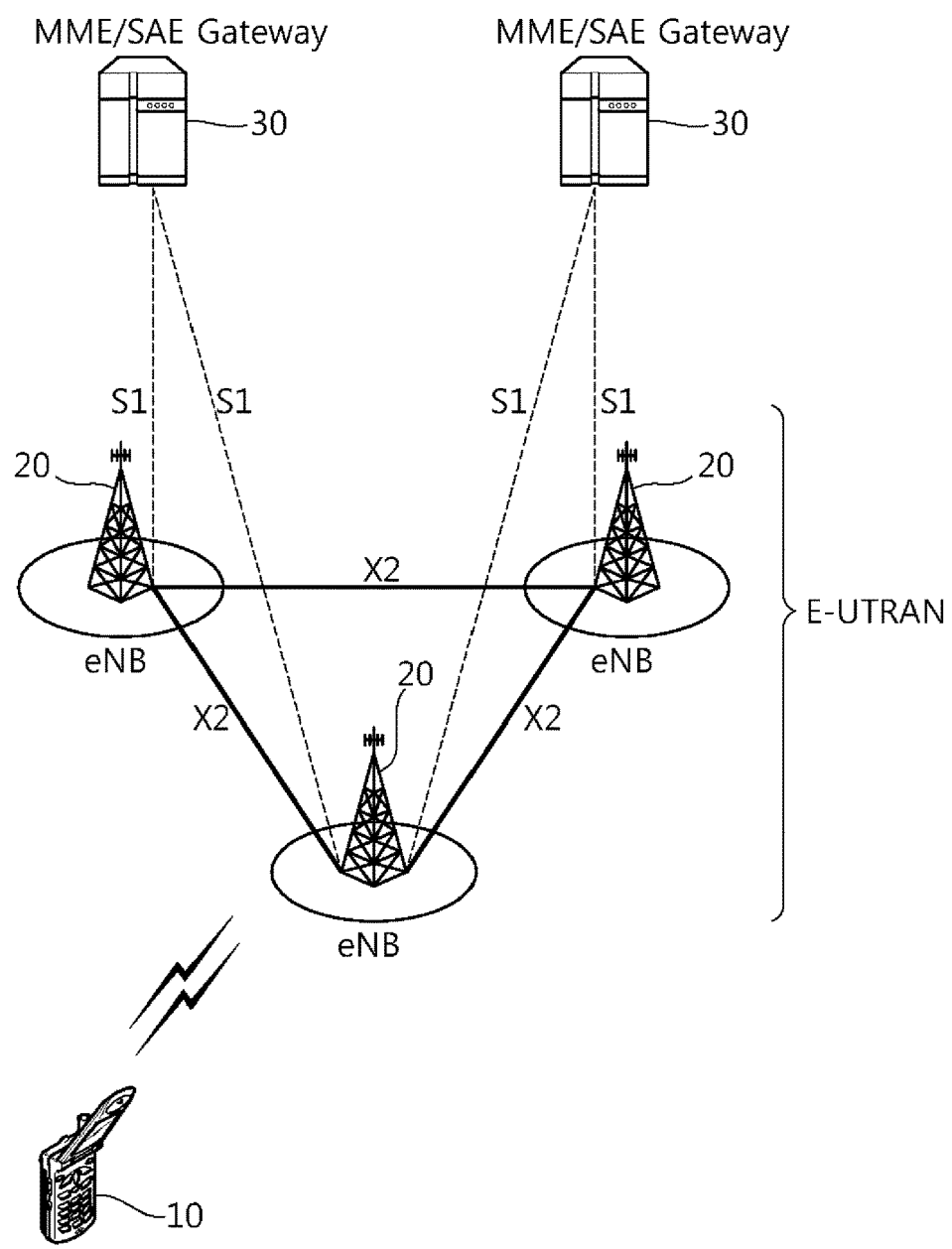
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
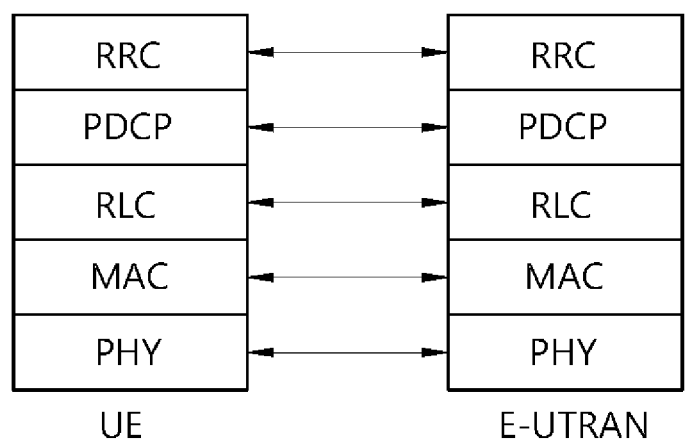
FIG. 2 is a diagram showing radio interface protocol architecture for a control plane.
Figure 3:
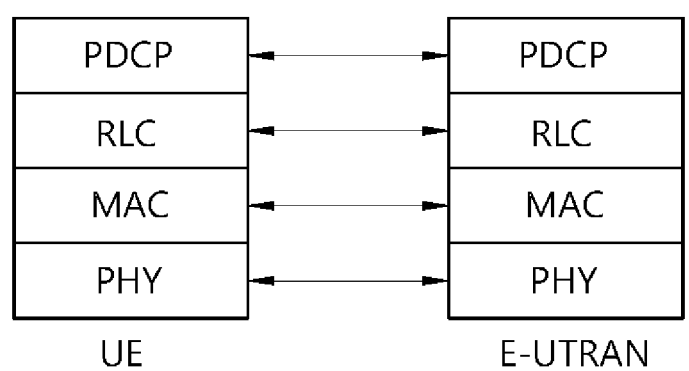
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
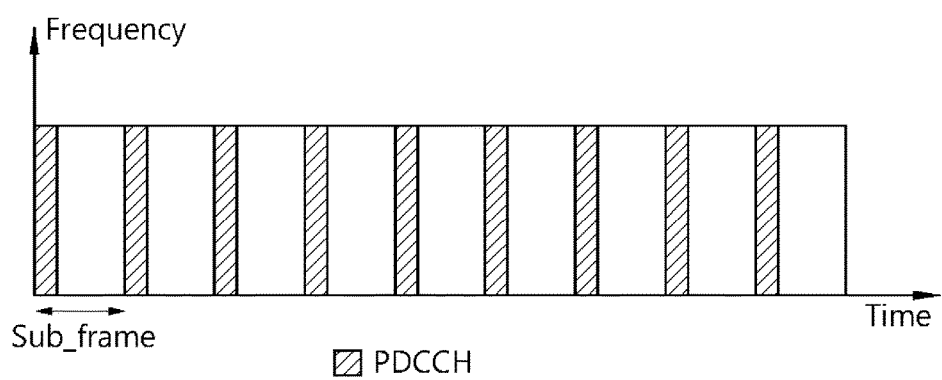
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A radio resource state (RRC) state indicates whether an RRC of a user equipment (UE) is logically connected to an RRC of a network. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED has the RRC connection established with the network, the network can recognize the existence of the UE in the RRC_CONNECTED and can effectively control the UE. Meanwhile, the UE in the RRC_IDLE cannot be recognized by the network, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the network through an RRC connection procedure and then may transition to the RRC_CONNECTED. The UE which remains in the RRC_IDLE may need to establish the RRC connection with the network when uplink data transmission is necessary due to a user's call attempt or the like or when there is a need to transmit a response message upon receiving a paging message from the network.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED. To access the network, the UE may perform a process of registering to the network through an initial attach procedure. If the initial attach procedure is successfully performed, the UE and the MME may be in the EMM-REGISTERED.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE establishes an RRC connection with the E-UTRAN, the UE may be in the ECM-CONNECTED. When the MME in the ECM-IDLE establishes an S1 connection with the E-UTRAN, the MME may be in the ECM-CONNECTED. When the UE is in the ECM-IDLE, the E-UTRAN does not have information on the context of the UE. Therefore, the UE in the ECM-IDLE can perform a UE-based mobility related procedure such as cell selection or cell reselection without having to receive a command of the network. If a location of the UE in the ECM-IDLE becomes different from a location known to the network, the UE may report the location of the UE to the network through a tracking area update procedure. On the other hand, the mobility of the UE in the ECM-CONNECTED may be managed by the command of the network.

Figure 5:
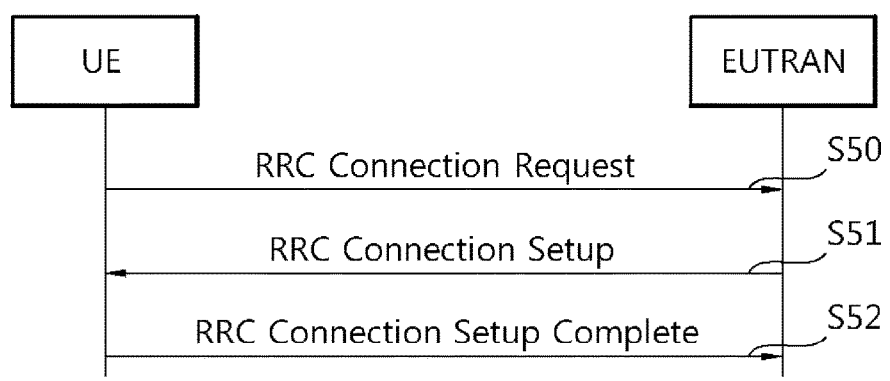
FIG. 5 shows an RRC connection establishment procedure.

FIG. 5 shows an RRC connection establishment procedure. It may be referred to Section 5.3.3 of 3GPP TS 36.331 V10.5.0 (2012-03). The purpose of this procedure is to establish an RRC connection. The RRC connection establishment may involve SRB 1 establishment. The RRC connection establishment procedure is also used to transfer the initial NAS dedicated information/message from the UE to the E-UTRAN. The E-UTRAN may apply the RRC connection establishment procedure to establish SRB1 only.

Referring to FIG. 5, at step S50, the UE transmits an RRC connection request (RRCConnectionRequest) message to the E-UTRAN. At step S51, the E-UTRAN transmits an RRC connection setup (RRCConnectionSetup) message to the UE. At step S52, the UE transmits an RRC connection setup complete (RRCConnectionSetupComplete) message to the E-UTRAN.

Figure 6:
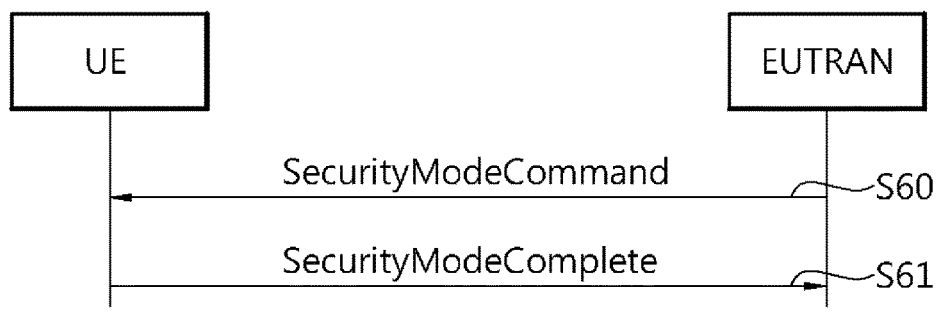
FIG. 6 shows an initial security activation procedure.

FIG. 6 shows an initial security activation procedure. It may be referred to Section 5.3.4 of 3GPP TS 36.331 V10.5.0 (2012-03). The purpose of this procedure is to activate access stratum (AS) security upon RRC connection establishment.

Referring to FIG. 6, at step S60, the E-UTRAN transmits a security mode command (SecurityModeCommand) message to the UE. At step S61, the UE transmits a security mode complete (SecurityModeComplete) message to the E-UTRAN.

Figure 7:
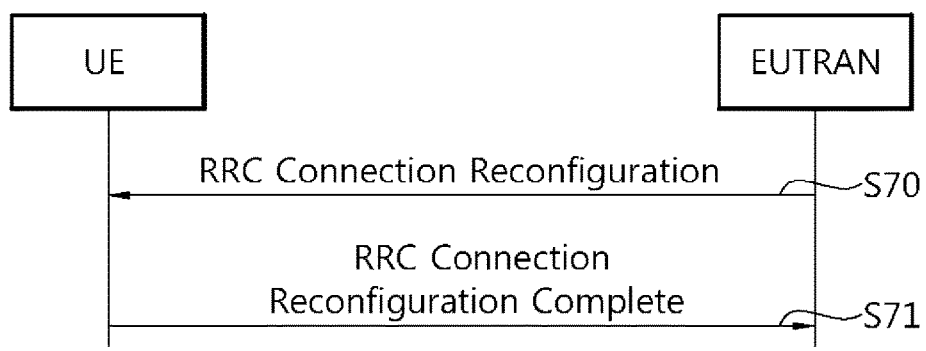
FIG. 7 shows an RRC connection reconfiguration procedure.

FIG. 7 shows an RRC connection reconfiguration procedure. It may be referred to Section 5.3.5 of 3GPP TS 36.331 V10.5.0 (2012-03). The purpose of this procedure is to modify an RRC connection, e.g. to establish/modify/release RBs, to perform handover, to setup/modify/release measurements, to add/modify/release secondary cells (SCells). As part of the RRC connection reconfiguration procedure, NAS dedicated information may be transferred from the E-UTRAN to the UE.

Referring to FIG. 7, at step S70, the E-UTRAN transmits an RRC connection reconfiguration (RRCConnectionReconfiguration) message to the UE. At step S71, the UE transmits an RRC connection reconfiguration complete (RRCConnectionReconfigurationComplete) message to the E-UTRAN.

Device-to-device (D2D) connection is described below.

The D2D connection is a connection between one master UE (M-UE) and one slave UE (S-UE). That is, the D2D connection is a direct connection between UEs. The M-UE may control the D2D connection with the S-UE autonomously (i.e. UE autonomous mode) or under full/partial control of an E-UTRAN (i.e. E-UTRAN planned mode). One M-UE may configure zero, one or more D2D connections. Different D2D connections may be established with different S-UEs.

The E-UTRAN may configure following two D2D modes in a cell. Only one D2D mode may be configured for a specific cell, for a specific M-UE, for a specific S-UE, or for a specific D2D connection between one M-UE and one S-UE.

1) E-UTRAN planned mode: The E-UTRAN (i.e. eNodeB (eNB) serving the M-UE called 'serving eNB') is responsible for maintaining D2D connection (in terms of radio resource or quality of service (QoS) over D2D connection). The serving eNB has S-UE context for the S-UE connected to the M-UE. A mobility management entity (MME) connected to the serving eNB has S-UE context for the S-UE connected to the M-UE.

2) UE autonomous mode: The M-UE is responsible for maintaining D2D connection (in terms of radio resource or QoS over D2D connection). The serving eNB has no S-UE context for the S-UE connected to the M-UE. The MME connected to the serving eNB may or may not have S-UE context for the S-UE connected to the M-UE.

The S-UE may or may not have an RRC connection with either the serving eNB or another eNB for both modes.

In addition, a D2D hybrid mode may be defined. In the D2D hybrid mode, both the UE autonomous mode and the E-UTRAN planned mode are used for a single D2D connection between one M-UE and one S-UE. Which mode between the UE autonomous and the E-UTRAN planned mode is used for the D2D connection may depend on QoS of D2D radio bearers between the M-UE and the S-UE. For example, a D2D DRB for voice or video service may be established based on the E-UTRAN planned mode. A D2D DRB for data downloading/uploading service may be established based on the UE autonomous mode. Semi-persistent scheduling (SPS) transmissions over the D2D connection may be configured by the serving eNB in the E-UTRAN Planned Mode. Which mode between the UE autonomous and E-UTRAN planned mode is used for the D2D connection may be decided by the serving eNB. When the M-UE makes a D2D connection with the S-UE, the M-UE may transmit information about this D2D connection establishment to the serving eNB. Upon receiving the information from the M-UE, the serving eNB ma inform the M-UE which mode should be configured for this D2D connection among the UE autonomous, the E-UTRAN planned, and the hybrid mode.

Hereinafter, it is assumed that the serving eNB is an eNB serving the M-UE. If the eNB serves the S-UE, but it does not serve the M-UE, the eNB is clearly written as 'S-UE serving eNB' hereinafter. When the S-UE serving eNB is used to express a certain procedure, 'M-UE serving eNB' may be also used.

Followings are identities used for the D2D connection.
M-CRNTI: cell radio network temporary identity (C-RNTI) allocated for the M-UE
S-CRNTI: C-RNTI allocated for the S-UE
S-UE identity: The S-UE identity may correspond to one of an international mobile subscriber identity (IMSI), a system architecture evolution (SAE) temporary mobile subscriber identity (S-TMSI), an S-CRNTI, and a new UE identity allocated to the S-UE. The S-UE identity may be allocated by the M-UE, the M-UE serving eNB, the S-UE serving eNB, or an EPC node such as MME/home location register (HLR).

Followings are channels used for the D2D connection.
D2D downlink: a direction from the M-UE to the S-UE
D2D uplink: a direction from the S-UE to the M-UE
D-BCCH: D2D downlink broadcast control channel used over the D2D connection. The M-UE broadcasts the D-BCCH to one or more S-UEs, e.g. for delivery of D2D system information or helping an S-UE detect another UE for the D2D connection.
D-RACH: D2D uplink random access channel used over the D2D connection. The M-UE may allocate radio resources for the D-RACH. The S-UE may know configuration of the D-RACH by receiving information on the D-BCCH. The S-UE may transmit a preamble or message over the D-RACH to the M-UE, in order to make a connection with the M-UE or in order to transmit data to the M-UE.
D-CCCH: D2D uplink/downlink common control channel used over the D2D connection.
D-DCCH: D2D uplink/downlink dedicated control channel used over the D2D connection.
D2D RB: radio bearer which is established over the D2D connection between the M-UE and the S-UE. A DRB and a SRB may be provided for D2D user data and D2D control info, respectively.

Figure 8:
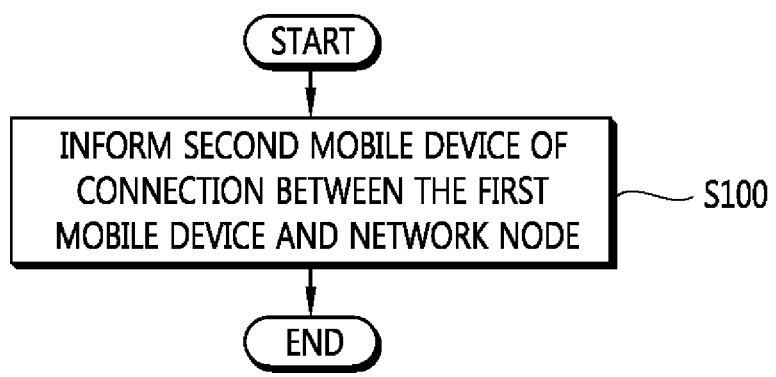
FIG. 8 shows an example of a method for transmitting D2D related information according to an embodiment of the present invention.

FIG. 8 shows an example of a method for transmitting D2D related information according to an embodiment of the present invention.

At step S100, a first mobile device transmits to a second mobile device information on connection between the first mobile device and a network node.

Information on the connection between the first mobile device and the network node may be an identity of the network node. The identity of the network node may be a cell identity of a cell controlled by the network node. In this case, the first mobile device and the network node are connected by a first connection. The first connection may be an RRC connection. The first mobile device and the second mobile device are connected by a second connection. The second connection may be a D2D connection.

Or, Information on the connection between the first mobile device and the network node may be an indication indicating whether a first connection between the first mobile device and the network node is established or not.

In FIG. 8, the first mobile device may be an M-UE, and the second mobile device may be an S-UE. Or, the first mobile device may be an S-UE, and the second mobile device may be an M-UE.

Figure 9:
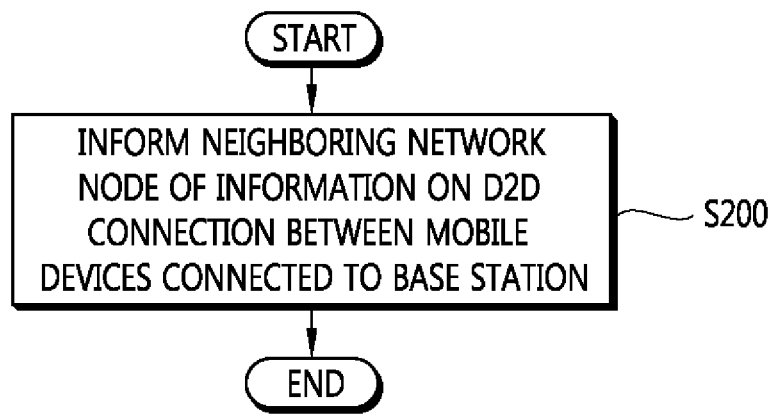
FIG. 9 shows another example of a method for transmitting D2D related information according to an embodiment of the present invention.

FIG. 9 shows another example of a method for transmitting D2D related information according to an embodiment of the present invention.

At step S200, a base station transmits information on a D2D connection between mobile devices which are connected to the base station, to a neighboring network node. The information on the D2D connection may include information on the mobile devices, e.g. list of UE identities, a D2D mode, and parameters/configurations related to the D2D connection.

As described above, eNBs may exchange information on the D2D connection. In addition, eNBs may share the exchanged information with mobile devices connected to the base station. The mobile devices may use this information to detect neighboring mobile devices for D2D connection establishment.

Figure 10:
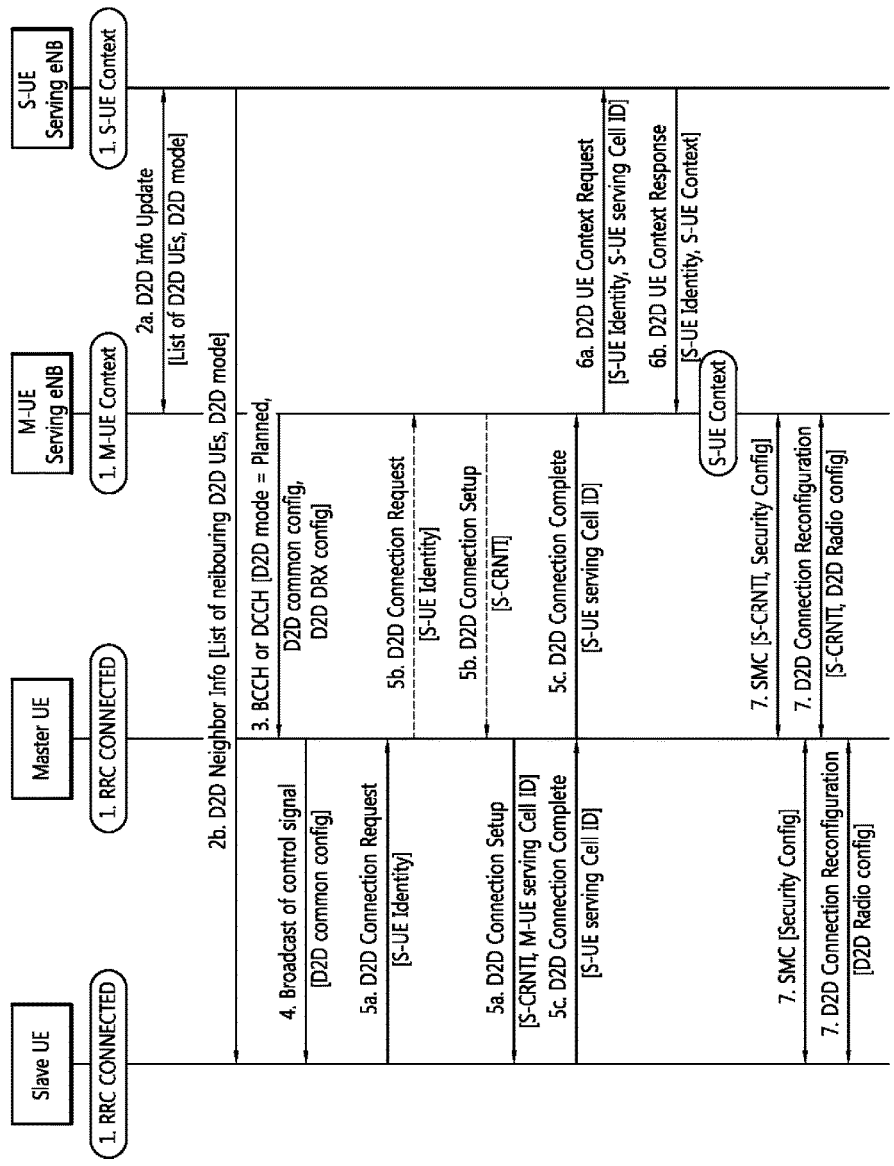
FIG. 10 shows an example of a D2D connection establishment for an E-UTRAN planned mode according to an embodiment of the present invention.

FIG. 10 shows an example of a D2D connection establishment for an E-UTRAN planned mode according to an embodiment of the present invention.

1. It is assumed that the S-UE is connected to the S-UE serving eNB and the M-UE is connected to the M-UE serving eNB. Thus, the S-UE and the M-UE are in RRC_CONNECTED. The M-UE serving eNB has M-UE context. The S-UE serving eNB has S-UE context. The M-UE serving eNB may broadcast D2D control information that includes a set of D-BCCH resources and a set of D2D random access resources including a set of D2D RAPIDs.

2a. eNBs may exchange information about D2D connection. For instance, the M-UE serving eNB may inform the S-UE serving eNB of the D2D connection such as information on UEs connected to the M-UE serving eNB (e.g. list of UE identities) and a D2D mode. Likewise, the S-UE serving eNB may inform the M-UE serving eNB of the D2D connection such as information on UEs connected to the M-UE serving eNB (e.g. list of UE identities) and a D2D mode.

2b. eNB may share the exchanged information with UEs connected to this eNB. The UEs may use this information to detect neighboring UEs for D2D connection establishment.

An embodiment of the present invention shown in FIG. 9 is applied to steps 2a and 2b above.

3. The serving eNB may configure one or more UE for D2D connection via an RRC message on the BCCH or the DCCH. When the serving eNB configures D2D connection, it may indicate which D2D mode the UE should operate in, i.e., a UE autonomous mode or an E-UTRAN planned mode. It is assumed that the E-UTRAN planned mode is configured.

The RRC message may also include a D2D common configuration, and a D2D DRX configuration. The D2D common configuration may include configurations of common channels used over the D2D connection, such as D-RACH, D-BCCH and D-CCCH. The D2D DRX configuration may contain a possible DRX configuration which may be used for one or more D2D connections.

4. The M-UE broadcasts a control signal on the D-BCCH by using D-BCCH configuration contained in the D2D common configuration based on the D2D control information. Some of D2D common configuration may be broadcast over the D-BCCH, hopefully up to the S-UE.

The S-UE may receive the D2D control information from the serving eNB or another eNB. By using the D2D control information, the S-UE may detect the M-UE via the D-BCCH. The S-UE may acquire some of the D2D common configuration from the D-BCCH, such as configurations of D-RACH and D-CCCH.

5a. When the S-UE detects the M-UE, an RRC layer of the S-UE informs this detection to upper layers of the S-UE. A NAS layer of the S-UE may request the RRC layer of the S-UE to make a D2D connection. The S-UE transmits a D2D connection request message to the M-UE. The D2D connection request message may include an S-UE identity. Then, the S-UE receives a D2D connection setup message from the M-UE. The D2D connection setup message may include an S-CRNTI and an M-UE serving cell ID.

5b. In the E-UTRAN planned mode, the M-UE may transfer the received D2D connection request message including the S-UE identity to the serving eNB. Then, if the serving eNB transmits a D2D connection setup message to the M-UE, the M-UE transmits the received D2D connection setup message to S-UE. The serving eNB may allocate an S-CRNTI for this the S-UE via the D2D connection setup message. The M-UE uses this S-CRNTI to identify this S-UE in a later message.

5c. After receiving the D2D connection setup message from the M-UE, the S-UE transmits a D2D connection setup complete message to the M-UE to finalize the D2D connection establishment. The D2D connection setup complete message may contain an S-UE serving cell ID. The M-UE delivers the received D2D connection setup complete message to the M-UE serving eNB.

An embodiment of the present invention shown in FIG. 8 is applied to steps 5a and 5c above.

6a. If the S-UE serving cell ID is received from the S-UE via the M-UE, the M-UE serving eNB searches the S-UE serving eNB for the S-UE by using the S-UE serving cell ID, and then transmits a D2D UE context request message to the S-UE serving eNB. The D2D UE context request message may include the S-UE identity and the S-UE serving cell ID. If the S-UE serving cell ID and the NAS S-UE initial message are not received from the S-UE, the M-UE may configure the UE autonomous mode and then notify this mode to the M-UE/S-UE serving eNB.

6b. When the D2D UE context request message is received from the M-UE serving eNB, the S-UE serving eNB transmits a D2D UE context response message including the S-UE identity and S-UE context to the M-UE serving eNB. The M-UE serving eNB may transmit the received S-UE context to the M-UE. The S-UE context may contain QoS information, security information, S-UE capability Information, and so on, like normal UE context which is stored in an MME for registered UE. The M-UE may receive the S-UE context from the MME via the M-UE serving eNB.

7. The serving eNB initiates a security mode command procedure and a DRB setup procedure for this D2D connection. An SMC message and a D2D connection reconfiguration message are transmitted from the serving eNB to the S-UE via the M-UE. The serving eNB uses the S-CRNTI to identify the S-UE that should receive the SMC message and the D2D connection reconfiguration message. As a result of those procedures, the S-UE and the M-UE are ready for D2D transmission over DRBs over the secure D2D connection.

Figure 11:
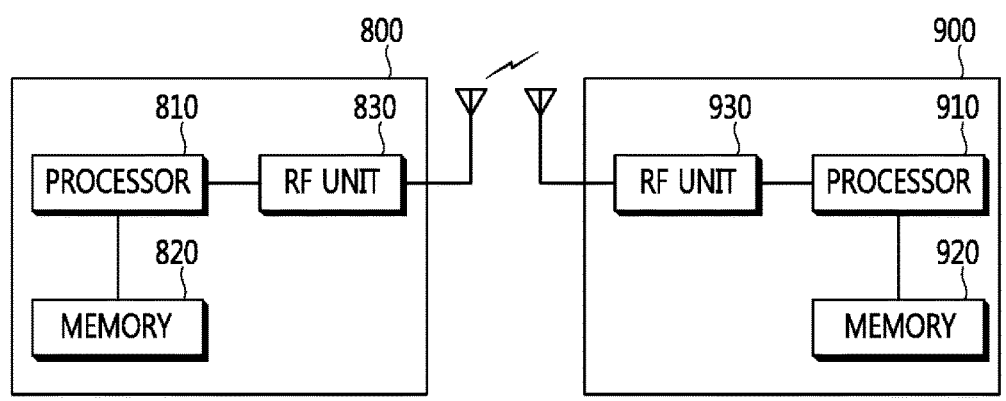
FIG. 11 is a block diagram showing wireless communication system to implement an embodiment of the present invention.

FIG. 11 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing a device-to-device (D2D) operation by a first user equipment (UE) in a wireless communication system, the method comprising:
   receiving, by the first UE, configuration information of an evolved-universal mobile telecommunications service (UMTS) terrestrial radio access network (E-UTRAN) planned mode for the D2D operation from an evolved NodeB (eNB),
   wherein the E-UTRAN planned mode is a D2D mode in which the eNB controls radio resources for the D2D operation; and
   performing, by the first UE, the D2D operation with a second UE by using the radio resources in the E-UTRAN planned mode.

2. The method of claim 1, wherein the configuration information is received via a radio resource control (RRC) message on a dedicated control channel (DCCH).

3. The method of claim 1, further comprising determining to operate in the E-UTRAN planned mode for the D2D operation according to the configuration information.

4. The method of claim 1, wherein the eNB has a context for the second UE.

5. A method for performing a device-to-device (D2D) operation by a first user equipment (UE) in a wireless communication system, the method comprising:
   receiving, by the first UE, configuration information of a UE autonomous mode for the D2D operation from an evolved NodeB (eNB),
   wherein the UE autonomous mode is a D2D mode in which the first UE controls radio resources for the D2D operation; and
   performing, by the first UE, the D2D operation with a second UE by using the radio resources in the UE autonomous mode.

6. The method of claim 5, wherein the configuration information is received via a radio resource control (RRC) message on a dedicated control channel (DCCH).

7. The method of claim 5, further comprising determining to operate in the UE autonomous mode for the D2D operation according to the configuration information.

8. The method of claim 5, wherein the eNB does not have a context for the second UE.

* * * * *